(12) United States Patent
Kim et al.

(10) Patent No.: US 10,476,648 B2
(45) Date of Patent: Nov. 12, 2019

(54) METHOD AND APPARATUS FOR TRANSMITTING FRAME

(71) Applicant: LG ELECTRONICS INC., Seoul (KR)

(72) Inventors: Suhwook Kim, Seoul (KR); Kiseon Ryu, Seoul (KR); Wookbong Lee, Seoul (KR); Jeongki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 15/316,823

(22) PCT Filed: Jan. 28, 2015

(86) PCT No.: PCT/KR2015/000898
§ 371 (c)(1),
(2) Date: Dec. 6, 2016

(87) PCT Pub. No.: WO2015/194731
PCT Pub. Date: Dec. 23, 2015

(65) Prior Publication Data
US 2017/0104570 A1    Apr. 13, 2017

Related U.S. Application Data

(60) Provisional application No. 62/014,655, filed on Jun. 19, 2014.

(51) Int. Cl.
*H04L 5/00* (2006.01)
*H04B 7/26* (2006.01)
(Continued)

(52) U.S. Cl.
CPC ............ *H04L 5/0055* (2013.01); *H04B 7/26* (2013.01); *H04L 27/26* (2013.01);
(Continued)

(58) Field of Classification Search
CPC ......... H04L 5/0055; H04L 27/26; H04B 7/26; H04W 72/0446; H04W 74/0816
(Continued)

(56) References Cited

U.S. PATENT DOCUMENTS

2010/0316150 A1    12/2010   Amini et al.
2011/0261742 A1*   10/2011   Wentink ............... H04L 1/1854
                                                                  370/312
(Continued)

FOREIGN PATENT DOCUMENTS

CN         102859924         1/2013
CN         103250459         8/2013
(Continued)

OTHER PUBLICATIONS

"IEEE P802.11-REVmc™/D2.0, Oct. 2013 Draft Standard for Information technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE P802.11-REVmc™/D2.0, Oct. 2013, section 8.3.1.2.-8.3.1.3., pp. 533-534 (3 pages provided).
(Continued)

*Primary Examiner* — Phong La
(74) *Attorney, Agent, or Firm* — Lee, Hong, Degerman, Kang & Waimey

(57) ABSTRACT

Disclosed are a method and apparatus for transmitting a frame. A method for transmitting a frame in a wireless LAN comprises the steps of: an AP transmitting a first RTS frame, through a primary channel, to a plurality of first target STAs; the AP receiving, from one target STA from among the plurality of first target STAs, a first CTS frame as a response to the first RTS frame, through the primary channel; and the AP transmitting, to the plurality of first target STAs, a
(Continued)

plurality of pieces of first downlink data for each of the respective plurality of first target STAs, through a plurality of first subbands included in the primary channel on one first data frame, wherein a first RTS frame may include identification information for each of the plurality of first target STAs.

6 Claims, 12 Drawing Sheets

(51) Int. Cl.
  *H04L 27/26* (2006.01)
  *H04W 72/04* (2009.01)
  *H04W 74/08* (2009.01)
  *H04W 84/12* (2009.01)
  *H04W 74/00* (2009.01)

(52) U.S. Cl.
  CPC ... *H04W 72/0446* (2013.01); *H04W 74/0816* (2013.01); *H04W 74/006* (2013.01); *H04W 84/12* (2013.01)

(58) Field of Classification Search
  USPC .............................................. 370/336
  See application file for complete search history.

(56) References Cited

U.S. PATENT DOCUMENTS

| | | | |
|---|---|---|---|
| 2012/0076081 A1* | 3/2012 | Merlin | H04W 74/0816 370/329 |
| 2012/0082040 A1 | 4/2012 | Gong et al. | |
| 2012/0082147 A1 | 4/2012 | Liu et al. | |
| 2012/0147804 A1 | 6/2012 | Hedayat et al. | |
| 2013/0188571 A1 | 7/2013 | Cheong et al. | |
| 2014/0029543 A1 | 1/2014 | Fischer et al. | |
| 2015/0312386 A1* | 10/2015 | Lee | H04L 69/22 370/338 |
| 2016/0330757 A1* | 11/2016 | Cherian | H04W 72/1268 |

FOREIGN PATENT DOCUMENTS

| | | |
|---|---|---|
| CN | 103250461 | 8/2013 |
| EP | 3107223 | 12/2016 |
| EP | 3110035 | 12/2016 |
| JP | 2013541293 | 11/2013 |
| KR | 1020130003030 | 1/2013 |
| KR | 1020130077879 | 7/2013 |
| WO | 2012040495 | 3/2012 |

OTHER PUBLICATIONS

PCT International Application No. PCT/KR2015/000898, International Search Report dated Apr. 20, 2015, 3 pages.
Japan Patent Office Application No. 2016-570880, Office Action dated Dec. 20, 2017, 4 pages.
European Patent Office Application Serial No. 15809294.0, Search Report dated Jan. 9, 2018, 9 pages.
Morioka, Y. et al., "Multi-RTS Proposal," doc.: IEEE 802.11-10/1124r02, Sep. 2010, 14 pages.
Abeysekera, B. A. Hirantha Sithira, et al., "Performance evaluation of MU-RTS under OBSS environment," doc.: IEEE 802.11-10/1293r3, Nov. 2010, 20 pages.
Korean Intellectual Property Office Application No. 10-2015-7033536, Office Action dated Apr. 5, 2018, 5 pages.
The State Intellectual Property Office of the People's Republic of China Application No. 201580032100.5, Office Action dated Jun. 26, 2018, 8 pages.

* cited by examiner

FIG. 1
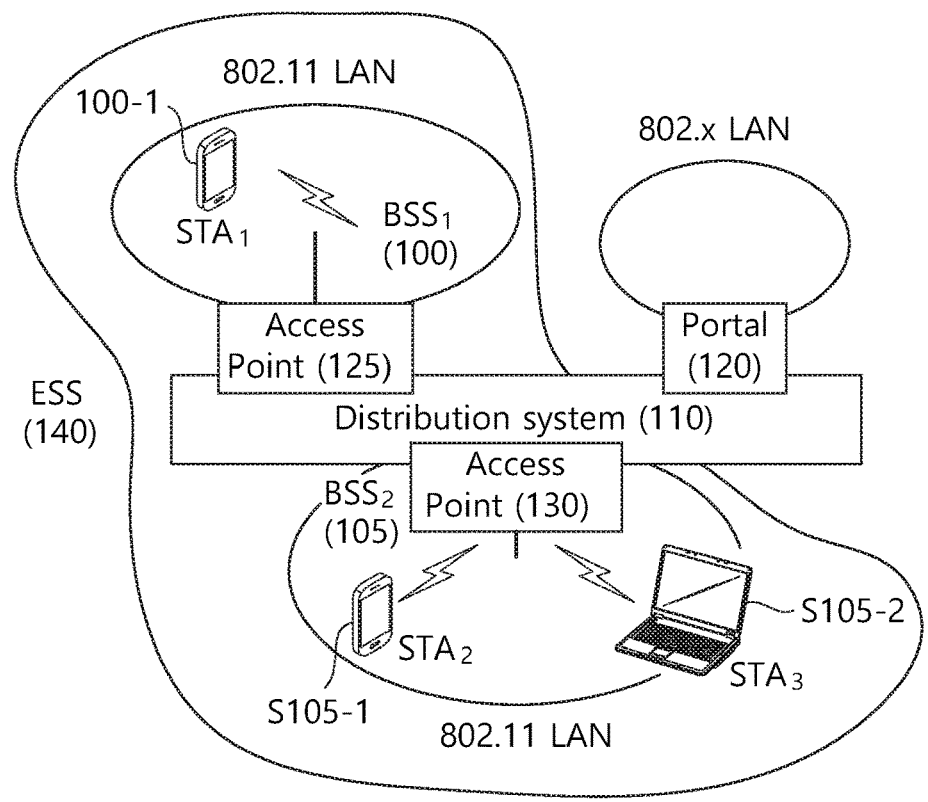
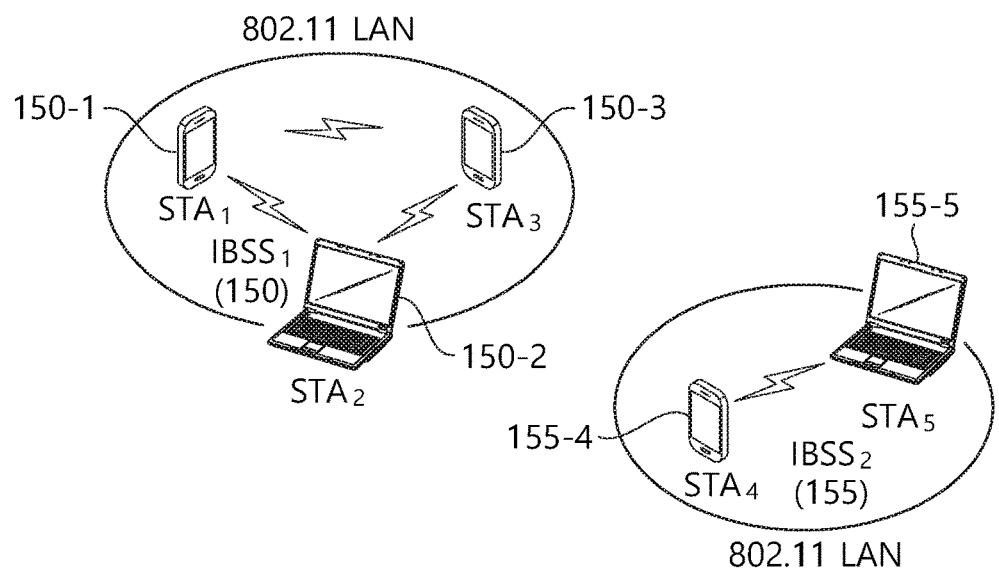

FIG. 5
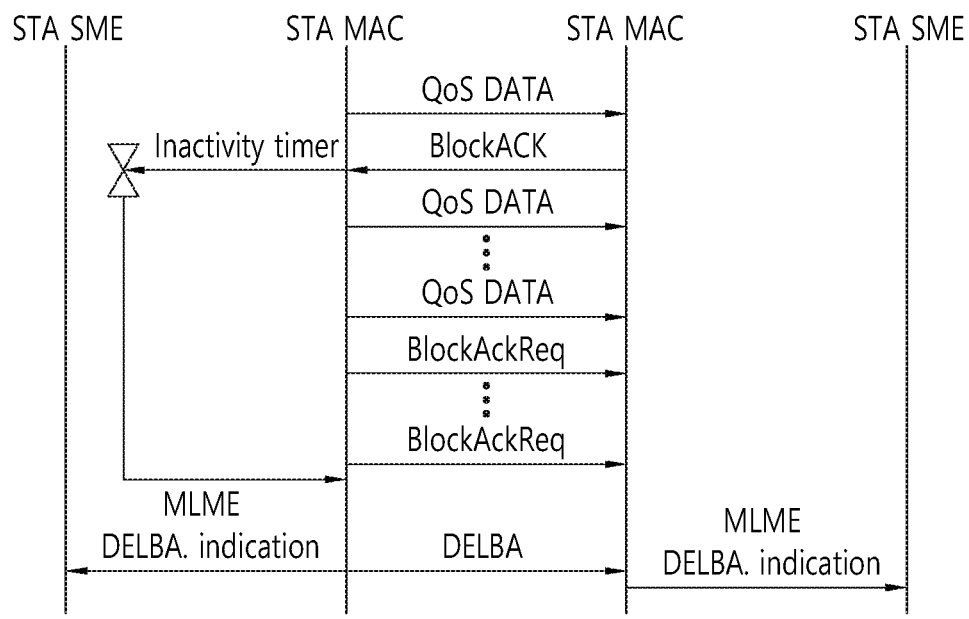
(a) Transmitting end
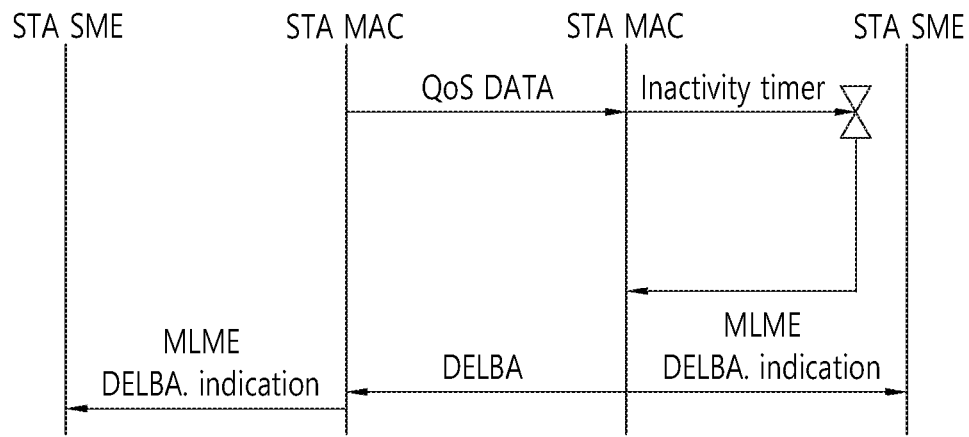
(b) Receiving end

METHOD AND APPARATUS FOR TRANSMITTING FRAME

CROSS-REFERENCE TO RELATED APPLICATIONS

This application is the National Stage filing under 35 U.S.C. 371 of International Application No. PCT/KR2015/000898, filed on Jan. 28, 2015, which claims the benefit of U.S. Provisional Application No. 62/014,655, filed on Jun. 19, 2014, the contents of which are all hereby incorporated by reference herein in their entirety.

BACKGROUND OF THE INVENTION

Field of the Invention

The present invention relates to a wireless communication and, most particularly, to a method and apparatus for transmitting a frame.

Related Art

A wide range of bandwidths from 20 MHz to 160 MHz become available for the existing wireless local area network (WLAN) system. Accordingly, choosing an appropriate channel bandwidth for communications between transmitting and receiving terminals is a determining factor for Wi-Fi performance.

To choose an appropriate channel bandwidth for communications between transmitting and receiving terminals, a dynamic channel bandwidth setting protocol based on a Request to Send (RTS) frame and a Clear to Send (CTS) frame has been developed for IEEE 802.11ac and subsequent standards. Initial RTS and CTS frames are designed to reduce a hidden node issue and data frame collision overheads. A transmitting terminal transmits an RTS frame to a receiving terminal before transmitting a data frame. The destination terminal, which has received the RTS frame, responds with a CTS frame to the transmitting terminal. Third terminals, which have received the RTS frame and a CTS control frame, may delay medium access for a certain period of time in order to protect the data frame to be subsequently transmitted.

According to the dynamic channel bandwidth setting protocol supported by IEEE 802.11ac and subsequent standards, the transmitting terminal transmits the RTS frame via a wide band grater than a channel bandwidth of 20 MHz, and the destination terminal may respond with the CTS frame according to a channel bandwidth currently available for the destination terminal. For example, when the transmitting terminal wishes to use a 160 MHz channel bandwidth, the transmitting terminal transmits the RTS frame through the 160 MHz channel bandwidth. If an 80 MHz channel bandwidth is currently available for the destination terminal, the destination terminal transmits the CTS frame through the 80 MHz channel bandwidth. When the transmitting terminal, which has transmitted the RTS frame, receives the CTS frame through the 80 MHz channel bandwidth, the transmitting terminal needs to transmit a data frame, subsequently transmitted to the target terminal, through a channel bandwidth of 80 MHz or smaller.

SUMMARY OF THE INVENTION

Technical Objects

An object of the present invention is to provide a method for transmitting a frame.

Another object of the present invention is to provide an apparatus for transmitting a frame.

Technical Solutions

In order to achieve the above-described technical object of the present invention, according to an aspect of the present invention, a method for transmitting a frame in a wireless LAN may include the steps of transmitting by an access point (AP) a first Request to Send (RTS) frame to a plurality of first target stations (STAs) through a first channel, receiving by the AP a Clear to Send (CTS) frame from one first target STA, among the plurality of first target STAs, through the first channel as a response to the first RTS frame, and transmitting by the AP each of a plurality of first downlink data corresponding to each of the plurality of first target STAs through each of a plurality of first subbands being included in the first channel within one first data frame to each of the plurality of first target STAs, wherein the first RTS frame may include identification information corresponding to each of the plurality of first target STAs.

In order to achieve the above-described technical object of the present invention, according to another aspect of the present invention, an access point for transmitting a frame in a wireless LAN may include a radio frequency (RF) unit configured to transmit and/or receive radio signals, and a processor operatively connected to the RF unit, wherein the processor may be configured to transmit by an access point (AP) a first Request to Send (RTS) frame to a plurality of first target stations (STAs) through a first channel, to receive a Clear to Send (CTS) frame from one first target STA, among the plurality of first target STAs, through the first channel as a response to the first RTS frame, and to transmit each of a plurality of first downlink data corresponding to each of the plurality of first target STAs through each of a plurality of first subbands being included in the first channel within one first data frame to each of the plurality of first target STAs, wherein the first RTS frame may include identification information corresponding to each of the plurality of first target STAs.

Effects of the Invention

Prior to transmitting downlink frames corresponding to a plurality of STAs, a medium protection procedure may be performed based on a transmission procedure of a RTS frame and a CTS frame. Therefore, the likelihood of inter-frame collision (or collision between frames) may be reduced, and wireless LAN transmission efficiency may be enhanced.

BRIEF DESCRIPTION OF THE DRAWINGS

FIG. 1 is a conceptual view illustrating a structure of a wireless local area network (WLAN).

FIG. 5 illustrates a block ACK operation.

DESCRIPTION OF EXEMPLARY EMBODIMENTS

Figure 2:
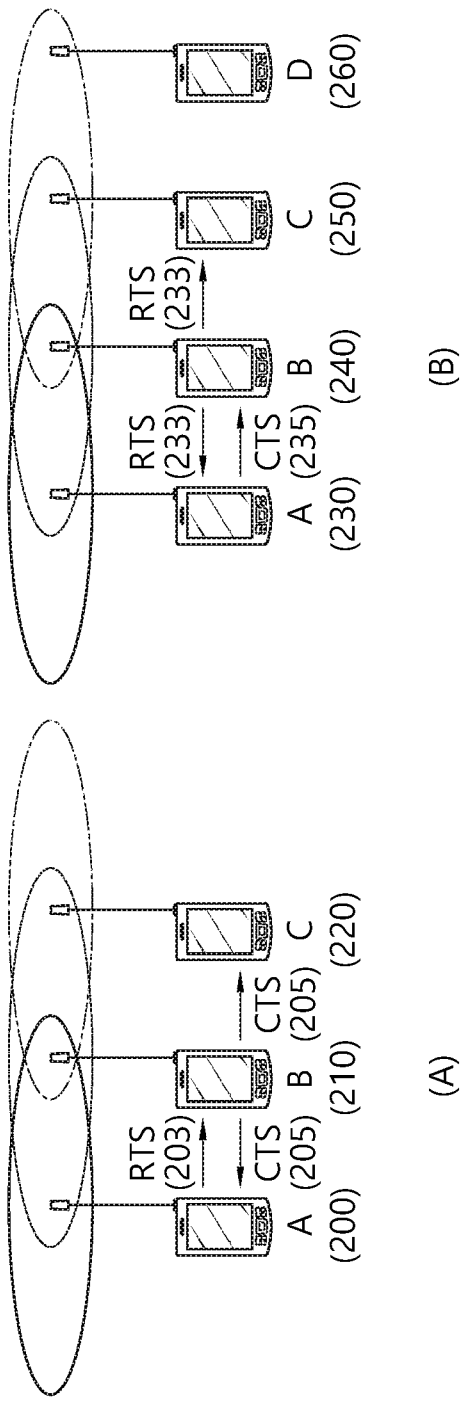
FIG. 2 is a conceptual view illustrating a method of using a Request to Send (RTS) frame and a Clear to Send (CTS) frame in order to resolve a hidden node issue and an exposed node issue.

FIG. 1 is a conceptual view illustrating a structure of a wireless local area network (WLAN).

An upper part of FIG. 1 shows the structure of the institute of electrical and electronic engineers (IEEE) 802.11 infrastructure network.

Referring to the upper part of FIG. 1, the WLAN system may include one or more basic service sets (BSSs) 100 and 105. The BSS 100 or 105 is a set of an AP such as access point (AP) 125 and a station (STA) such as STA1 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same service set identification (SSID).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent basic service set (BSS).

A lower part of FIG. 1 is a conceptual view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the Institute of Electrical and Electronics Engineers (IEEE) 802.11 standards and that includes a physical layer interface for radio media, and the term "STA" may, in its definition, include both an AP and a non-AP station (STA).

The STA may be referred to by various terms such as mobile terminal, wireless device, wireless transmit/receive unit (WTRU), user equipment (UE), mobile station (MS), mobile subscriber unit, or simply referred to as a user.

An access point (AP), which operates in a wireless local area network (WLAN) system, may transmit data to each of a plurality of stations (STAs) through the same time resource. If the transmission from the AP to the STA is referred to as a downlink transmission, the transmission of such AP to a plurality of STAs may be expressed by using the term downlink multi-user transmission (DL MU transmission) (or downlink multiple user transmission).

FIG. 2 is a conceptual view illustrating a method of using a Request to Send (RTS) frame and a Clear to Send (CTS) frame in order to resolve a hidden node issue and an exposed node issue.

Referring to FIG. 2, a short signaling frame, such as an RTS frame and a CTS frame, may be used to solve the hidden node issue and the exposed node issue. Neighboring STAs may recognize based on the RTS frame and the CTS frame whether data transmission and reception is performed between two STAs.

(A) of FIG. 2 illustrates a method of transmitting an RTS frame 203 and a CTS frame 205 in order to solve the hidden node issue.

It may be assumed that both STA A 200 and STA C 220 intend to transmit data frames to STAB 210. STA A 200 transmits an RTS frame 203 to STAB 210 before transmitting a data frame, and STA B 210 may transmit a CTS frame 205 to STA A 200. STA C 220 overhears the CTS frame 205 and recognizes that transmission of a frame is performed via a medium from STA A 200 to STA B 210. STA C 220 may set a network allocation vector (NAV) until STA A 200 finishes transmitting the data frame to STA B 210. Using such a method may prevent a collision between frames due to a hidden node.

(B) of FIG. 2 illustrates a method of transmitting an RTS frame 233 and a CTS frame 235 in order to solve the exposed node issue STA C 250 may determine whether a collision occurs if transmitting a frame to another STA D 260 based on monitoring of an RTS frame 233 and a CTS frame 235 between STA A 230 and STA B 240.

STA B 240 transmits the RTS frame 233 to STA A 230, and STA A 230 may transmit the CTS frame 235 to STA B 240. STA C 250 overhears only the RTS frame 233 transmitted by STA B 240 and does not overhear the CTS frame 235 transmitted by STA A 230. Thus, STA C 250 recognizes that STA A 230 is out of a carrier sensing range of STA C 250. Accordingly, STA C 250 may transmit data to STA D 260.

An RTS frame format and a CTS frame format are disclosed in 8.3.1.2 RTS frame format and 8.3.1.3 CTS frame format of IEEE P802.11-REVmcTM/D2.0, October 2013.

Figure 3:
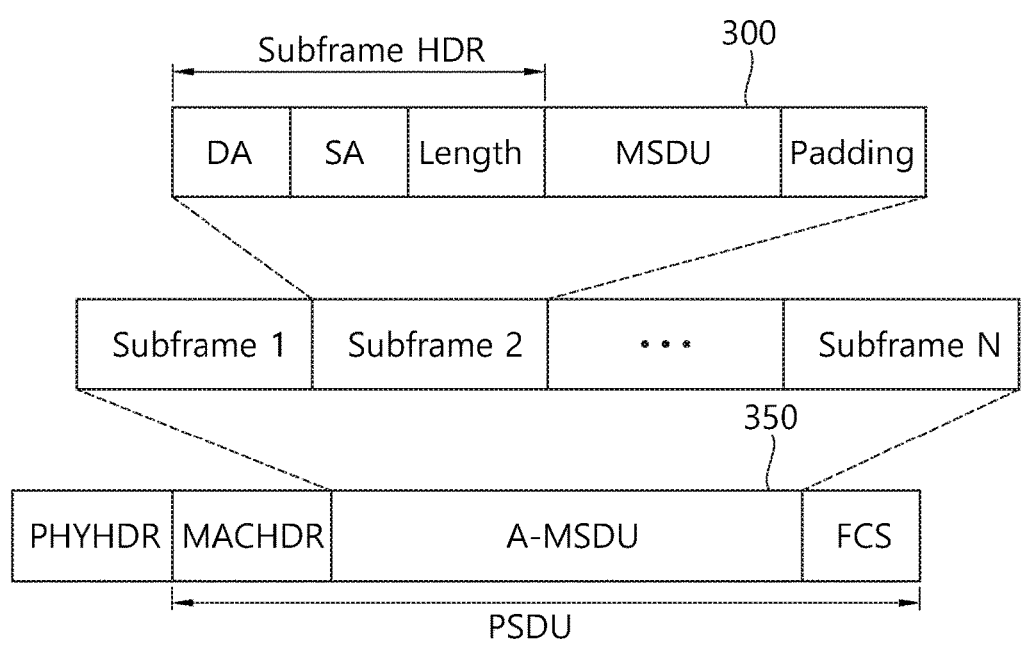
FIG. 3 is a conceptual view illustrating A-MSDU.

FIG. 3 is a conceptual view illustrating A-MSDU.

A method for performing aggregation of data frames in order to reduce MAC error overhead is defined in the IEEE 802.11n. A MAC service data unit (MSDU) 300, which is generated in an application layer in order to perform aggregation of the data frames, may be processed with aggregation in a higher layer of the MAC layer, thereby being generated as a single MSDU. The MSDU that is aggregated in the higher layer of the MAC layer may be defined by using the term aggregate-MSDU (A-MSDU) 350. The A-MSDU 350 may be generated based on an aggregation of multiple MSDUs 300 each having the same priority level and the receiver address (RA).

Each MSDU 300 may include a subframe header including information on a destination address, a source address, and an MSDU length. An A-MSDU subframe may be padded so that a total length of the A-MSDU subframe becomes a predetermined multiple (a multiple of 4octet). One A-MSDU 350 may include a plurality of A-MSDU subframes.

The A-MSDU 350 does not perform fragmentation differently from a single MSDU and is formed as a single QoS data MAC protocol data unit (MPDU) to be transmitted. The A-MSDU 350 may be transmitted and received among high throughput (HT) STAs. The HT STA has a capability to de-aggregate the A-MSDU 350. The HT STA may verify whether to receive the A-MSDU 350 based on a QoS field of the MAC header of the received MPDU and de-aggregate the A-MSDU.

When an ACK policy for the MPDU of the HT STA is set as a normal ACK, the A-MSDU 300 may not be aggregated to the A-MPDU. Further, whether the A-MSDU 300 may be aggregated to the A-MPDU may depend on whether a block acknowledgement agreement for each traffic identifier (TID) is made. Further, even when the block ACK agreement is made for the TID, when an indicator indicating whether to support an A-MSDU block ACK of an add block acknowledgement (ADDBA) response frame at a receiving side depending on an add block acknowledgement (ADDBA) request frame indicates that the block ACK is not supported, the A-MSDU may not be included in the A-MPDU.

Figure 4:
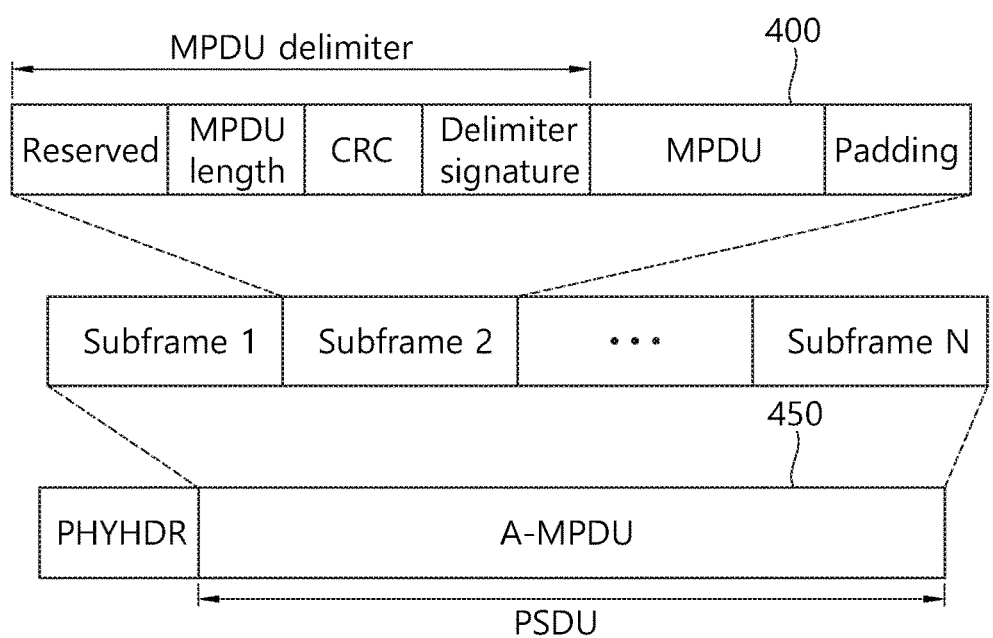
FIG. 4 is a conceptual view illustrating A-MPDU.

FIG. 4 is a conceptual view illustrating A-MPDU.

Referring to FIG. 4, a plurality of MPDUs 400 having the same receiver address (RA), and TID and ACK policy may form one A-MPDU 450 below the MAC layer.

The A-MPDU 450 may be constituted by one or more A-MPDU subframes and each A-MPDU subframe may include an MPDU delimiter and the MPDU 400. The MPDU delimiter may be used to determine whether an error occurs in the A-MPDU subframes constituting the A-MPDU 450. A plurality of A-MPUD subframes may form one A-MPDU 450.

Whether receiving the A-MPDU 450 is successful may be indicated based on the block ACK. The A-MPDU 450 may be formed only with respect to TID in which an HT-immediate BA agreement is made and values of duration/ID fields of the MPDU 400 constituting the A-MPDU 450 may be set to be the same as each other.

FIG. 5 illustrates a block ACK operation.

A block ACK mechanism is introduced to simultaneously make a response to a plurality of frames at the receiving side at the time of transmitting the plurality of frames during a TXOP period by obtaining a transmission opportunity in IEEE 802.11e. When the block ACK mechanism is used, overhead may be reduced and efficiency of the MAC layer may be improved like the A-MSDU or A-MPDU.

Referring to FIG. 5, block ACK transmission for the A-MPDU of one TID may include a setup process, a transmission process, and a tear down process. The setup process may be a process of requesting and responding a block ACK session.

In the transmission process, consecutive data may be transmitted and an aggregated response for the consecutive data may be received.

The tear down process may cancel the set up ACK session.

In detail, in the setup process, a transmitting side and the receiving side may transmit and receive the ADDBA request frame and the ADDBA response frame, respectively. In detail, the transmitting side may transmit the ADDBA request frame as a management frame to the receiving side. The ADDBA request frame may request a block ACK agreement for a current TID. The ADDBA request frame may transmit to the receiving side information on a block ACK policy type, a transmission buffer size at the transmitting side, a timeout value of the block ACK session, a starting sequence number (SSN), and the like. The receiving side that receives the ADDBA request frame may transmit the ADDBA response frame to the transmitting side as a response to the ADDBA request frame. The ADDBA response frame may include a block ACK agreement state, an ACK policy, a buffer size, and a timeout value.

In the transmission process, the transmitting side may transmit the A-MPDU. When a transmission condition of a block ACK request (BAR) frame for the A-MPDU is met, the transmitting side may transmit the BAR frame to the receiving side. When the transmitting side successfully transmits the A-MPDU, the receiving side that receives the BAR frame may transmit the block ACK for the A-MPDU to the transmitting side.

The tear down process may be performed when a set timeout value of an inactivity timer, which is set at the receiving side expires or there is no datum to be transmitted to the corresponding TID longer. For example, in order to recover the block ACK error, with the expiration of the set timeout value of the inactivity timer, a delete block acknowledgement (DELBA) frame may be transmitted to the receiving side or the transmitting side and the block ACK session may be terminated. When the transmitting side receives the block ACK, the inactivity timer at the transmitting side may be reset. When the receiving side receives the MPDU and the bock ACK request frame, the inactivity timer at the receiving side may be reset.

An AP operating in a wireless LAN system may transmit data to each of a plurality of STAs by using the same time resource. If the transmission from the AP to the STA is referred to as a downlink transmission, the transmission of such AP may be expressed by using the term downlink multi-user transmission (DL MU transmission) (or downlink multiple user transmission). In the legacy wireless LAN system, the AP was capable of performing DL MU transmission based on multiple input multiple output (MU MIMO), and such transmission may be expressed by using the term DL MU MIMO transmission. In the exemplary embodiment of the present invention, the AP may perform DL MU transmission based on an orthogonal frequency division multiplexing access (OFDMA), and such transmission may be expressed by using the term DL MU OFDMA transmission. In case the DL MU OFDMA transmission is used, the AP may transmit downlink data (or downlink frames) to each of the multiple STAs through each of the multiple frequency resources within an overlapping time resource.

Each of the PPDU, frame, and data that are transmitted via downlink transmission may be respectively expressed by using the terms downlink PPDU, downlink frame, and downlink data. The PPDU may correspond to a data unit including a PPDU header and a physical layer service data unit (PSDU) (or MAC protocol data unit (MPDU)). The PPDU header may include a PHY header and a PHY preamble, and the PSDU (or MPDU) may include a frame or may indicate a frame. A DL single user (SU) transmission may indicate a downlink transmission from the AP to one STA within the entire transmission resource.

Conversely, a transmission from an STA to the AP may be referred to as an uplink transmission, and the transmission of data from multiple STAs to the AP within the same time resource may be expressed by using the term uplink multi-user transmission (or uplink multiple user transmission). Unlike the legacy wireless LAN system, in the wireless LAN system according to the exemplary embodiment of the present invention, the UL MU transmission may also be supported. Each of the PPDU, frame, and data that are transmitted via uplink transmission may be respectively expressed by using the terms uplink PPDU, uplink frame, and uplink data. The uplink transmission that is performed by each of the multiple STAs may be performed within a frequency domain or a spatial domain.

In case the uplink transmission that is performed by each of the multiple STAs is performed within the frequency domain, different frequency resources respective to each of the multiple STAs may be allocated as uplink transmission resources based on orthogonal frequency division multiplexing access (OFDMA). Each of the multiple STAs may transmit an uplink frame to the AP by using the respective frequency resources allocated to each STA. Such transmission method using different frequency resources may also be expressed by using the term UL MU OFDMA transmission method.

In case the uplink transmission that is performed by each of the multiple STAs is performed within the spatial domain, different space time streams (or spatial streams) are allocated to each of the multiple STAs, and each of the multiple STAs may transmit an uplink frame to the AP by using different space time streams. Such as transmission method using different spatial streams may also be expressed by using the term UL MU MIMO transmission method. The UL SU transmission may indicate a downlink transmission from one STA to one AP within the entire transmission resource.

Hereinafter, an exemplary embodiment of the present invention discloses transmission and reception procedures of a RTS frame and a CTS frame for medium protection prior to the transmission of a downlink frame based on a DL MU MIMO transmission.

Additionally, hereinafter, a primary channel and a secondary channel having the same bandwidth size (e.g., 20 MHz) will be assumed in the exemplary embodiment of the present invention. Moreover, a primary channel and a secondary channel including each of the multiple subbands, which correspond to the frequency resources for the transmission that is based on DL MU OFDMA, will be assumed in the exemplary embodiment of the present invention. Each of the multiple subbands may be used for the transmission of downlink data that is performed by the AP to a specific STA. For example, each of the primary channel of 20 MHz and the secondary channel of 20 MHz may include 4 subbands of 5 MHz. The primary channel may be defined to have diverse sizes, such as 20 MHz, 40 MHz, 80 MHz, and so on, and the secondary channel may also be defined to have diverse sizes, such as 20 MHz, 40 MHz, 80 MHz, and so on. The size of the subbands may also be defined to sizes other than 5 MHz, such as 10 MHz, 2.5 MHz, and so on.

The AP (or STA) may perform the following procedure in order to transmit downlink data through the primary channel and the secondary channel. For example, the STA may perform a back-off procedure in the primary channel and may acquire authority on the channel access within the primary channel. Additionally, the STA may determine whether or not an additional channel band (e.g., secondary channel) is available for usage. For example, the AP may verify the channel status of the secondary channel during a point coordination function (PCF) interframe space (PIFS) duration before the expiration of the back-off timer. The secondary channel may correspond to the remaining channel excluding the primary channel among the entire channel bands that are available for usage. The secondary channel may also be expressed differently by using the term non-primary channel.

More specifically, the AP may determine the status of a channel during the PIFS prior to the transmission opportunity (TXOP) in order to determine whether the secondary channel is idle or busy. If the secondary channel is determined to be busy during the PIFS, the STA may determine that the status of the secondary channel is idle. Hereinafter, it will be assumed in the exemplary embodiment of the present invention that the primary channel and the secondary channel are available for usage.

Additionally, the distinction (or division) of the entire available frequency bandwidth (e.g., the primary channel and the secondary channel) and the distinction (or division) of the subbands (the 4 subbands included in each of the primary channel and the secondary channel) according to the exemplary embodiment of the present invention are arbitrarily performed. More specifically, the entire available frequency resources may be divided by using diverse methods, and the divided entire frequency resources may be used for the transmission of downlink data (or downlink frame) based on DL MU OFDMA, which is performed by the AP.

Figure 6:
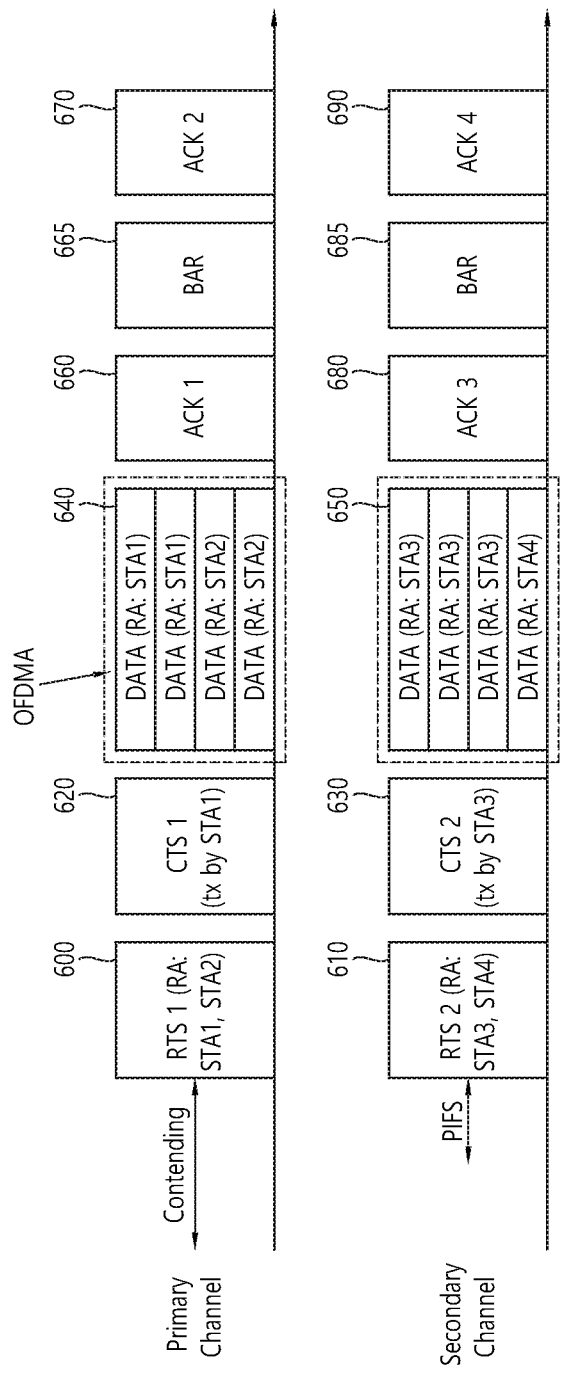
FIG. 6 is a conceptual view illustrating a DL MU OFDMA transmission method based on medium protection according to an exemplary embodiment of the present invention.

FIG. 6 is a conceptual view illustrating a DL MU OFDMA transmission method based on medium protection according to an exemplary embodiment of the present invention.

FIG. 6 discloses the transmission of downlink data based on DL MU OFDMA of an AP through each of a primary channel and a secondary channel after a medium protection procedure based on a RTS frame and a CTS frame.

Referring to FIG. 6, the AP may transmit each of a plurality of RTS frames 600 and 610 through each of a plurality of channels within an overlapping time resource. The AP may transmit RTS frame1 600 and RTS frame2 610 through each of the primary channel and the secondary channel.

Each of the plurality of RTS frames being transmitted through each of the plurality of channels may include information on a target STA that is to receive downlink data (RTS frame) through the transmitting channel of each of the plurality of RTS frames and/or information of downlink resource for the target STA.

For example, RTS frame1 600, which is transmitted by the AP through the primary channel, may include identification information corresponding to each of at least one STA target that is to receive downlink data, which are transmitted by the AP through the primary channel, and/or information on downlink resources being allocated for the transmission of downlink data to each of the at least one target STA. Additionally, RTS frame2 610, which is transmitted by the AP through the secondary channel, may include identification information corresponding to each of at least one STA target that is to receive downlink data, which are transmitted by the AP through the secondary channel, and/or information on downlink resources being allocated for the transmission of downlink data to each of the at least one target STA.

More specifically, according to the exemplary embodiment of the present invention, each of the plurality of RTS frames being transmitted by the AP through each of the plurality of channels may include identification information of at least one target STA that is to receive downlink data through a plurality of subbands being included in a transmitting channel through which the RTS frame is transmitted, among the plurality of channels, and/or information on downlink resources being allocated to each of the at least one target STA for the transmission of downlink data. Hereinafter, the downlink resource being allocated to the at least one target STA for the transmission of downlink data may also be expressed by using the term target STA allocation resource (or target STA allocation subband).

More specifically, the receiving address (RA) field of the RTS frames being transmitted through each of the plurality of channels may include information on the target STA that is to receive downlink data (or that is to receive the RTS frame) through a target STA allocation subband being included in the transmitting channel of the RTS frame. Additionally, the RA field or another resource allocation field being included in the RTS frame may include information on the target STA allocation subband. Alternatively, a PPDU header of a RTS PPDU carrying the RTS frame may include identification information of the target STA and information on the target STA allocation subband. Detailed information on the RTS frame and the format (or structure) of the RTS PPDU will be described later on in detail.

For example, the RA field of RTS frame1 600, which is transmitted through the primary channel, may include information on the identifiers (e.g., MAC address, association identifier (AID), partial association identifier (PAID)) of each of STA1 and STA2, which correspond to the target STAs that are to receive the downlink data through the primary channel. Additionally, the RA field (or resource allocation field) of RTS frame1 600 may include information on the subband (or frequency resource) that is allocated for each of STA1 and STA2 as the information on the target STA allocation subband. For example, the RA field (or resource allocation field) of RTS frame1 600 may indicate that, among the 4 subbands included in the primary channel, 2 subbands are allocated to STA1 for the transmission of downlink data, and that the remaining 2 subbands are allocated to STA2 for the transmission of downlink data.

The RA field of RTS frame2 610, which is transmitted through the secondary channel, may include information on the identifiers (e.g., MAC address, AID, PAID) of each of STA3 and ST4, which correspond to the target STAs that are to receive the downlink data through the secondary channel Additionally, the RA field (or resource allocation field) of RTS frame2 610 may include information on the resource (or subband) that is allocated for each of STA3 and STA4 as the information on the target STA allocation subband. For example, the RA field (or resource allocation field) of RTS frame2 610 may indicate that, among the 4 subbands included in the secondary channel, 3 subbands are allocated to STA3 for the transmission of downlink data, and that the remaining 1 subband is allocated to STA4 for the transmission of downlink data.

As described above, although each of the plurality of RTS frames (or RTS PPDUs) being transmitted through each of the plurality of channels may be transmitted within each of the transmitting channels, the RTS frame may also be transmitted through one RTS PPDU within the entire transmitting resource including the plurality of channels (e.g., the primary channel and the secondary channel). The one RTS PPDU for the transmission of the RTS frame may correspond to a DL MU PPDU format, which will be described later on. The DL MU PPDU format may include a PPDU header including an overlapping (or duplicated) field. More specifically, the entire target STAs that are to receive downlink frames (RTS frames) within the entire transmitting resources may be indicated by a PPDU header of one RTS PPDU carrying the RTS frame, and the frequency resource for the downlink data reception of each of the entire target STAs may also be indicated by the PPDU header. In case of the example shown in FIG. 6, the PPDU header of one RTS PPDU may include identification information of the entire target STAs (e.g., STA1, STA2, STA3, and STA4) operating within the entire transmitting resources and information on some of the target STAs (STA1, STA2) being allocated to the frequency resource (primary channel) and the remaining target STAS (STA3, STA4) being allocated to the frequency resource (secondary channel), among the entire target STAs. STA1 and STA2 may receive the RTS frames being transmitted through the primary channel based on the PPDU header information, and STA3 and STA4 may receive the RTS frames being transmitted through the secondary channel based on the PPDU header information.

According to the exemplary embodiment of the present invention, only one target STA, among the plurality of target STAs, that has received the RTS frame being transmitted through one channel, among the plurality of channels, may transmit a CTS frame to the AP as a response to the RTS frame. Among the plurality of target STAs, the remaining target STAs excluding the one target STA transmitting the CTS frame may not transmit CTS frames to the AP. Hereinafter, the one target STA transmitting the CTS frame as a response to the RTS frame may be expressed by using the term CTS frame transmitting STA. The CTS frame transmitting STA may transmit a CTS frame to the AP through the same channel as the transmitting channel of the RTS frame.

More specifically, the one target STA, among STA1 and STA2, which correspond to the plurality of target STAs that have received RTS frame1 600 through the primary channel, may transmit CTS frame1 620 to the AP through the primary channel And, the one target STA, among STA3 and STA4, which correspond to the plurality of target STAs that have received RTS frame2 610 through the secondary channel, may transmit CTS frame2 630 to the AP through the secondary channel.

The CTS frame transmitting STA may be determined based on diverse methods.

For example, the CTS frame transmitting STA may be determined based on the RA field included in the RTS frame. The CTS frame transmitting STA may correspond to the first (or foremost) STA to be indicated in an order of multiple target STAs being indicated based on the RA field of the RTS frame. For example, multiple bits being included in the RA field may sequentially indicate multiple target STAs, and the CTS frame transmitting STA may correspond to the target STA that is indicated by the bit being located in the foremost position (or being the first to be decoded), among the multiple bits included in the RA field. Alternatively, the CTS frame transmitting STA may correspond to the target STA that is the first to be decoded and identified, when decoding the RA field.

The RA field of RTS frame1 600, which is transmitted through the primary channel, may sequentially include an identifier of STA1 and an identifier of STA2. In this case, among STA1 and STA2, STA1, which is the first to be indicated based on the RA field, may correspond to the CTS frame transmitting STA. Each of STA1 and STA2 may decode the RA field of RTS frame1 600 and may determine whether or not to transmit the CTS frame based on the decoded result. STA1 may determine the transmission of CTS frame1 based on the RA field, and STA2 may determine the non-transmission of the CTS frame based on the RA field. STA1 being the CTS frame transmitting STA may transmit the CTS frame1 620 to the AP through the primary channel.

The RA field of RTS frame2, which is transmitted through the secondary channel, may sequentially include an identifier of STA3 and an identifier of STA4. In this case, among STA3 and STA4, STA3, which is the first to be indicated based on the RA field, may correspond to the CTS frame transmitting STA. Each of STA3 and STA4 may decode the RA field of RTS frame2 610 and may determine whether or not to transmit the CTS frame based on the decoded result. STA3 may determine the transmission of CTS frame based on the RA field, and STA4 may determine the non-transmission of the CTS frame based on the RA field. STA3 being the CTS frame transmitting STA may transmit the CTS frame2 630 to the AP through the secondary channel.

CTS frame1 620, which is being transmitted by STA1, as a response to RTS frame1 600, within a predetermined period of time after receiving the RTS frame1 600, and CTS frame2 630, which is being transmitted by STA3, as a response to RTS frame2 610, within a predetermined period of time after receiving the RTS frame2 610, may be transmitted to the AP within an overlapping time resource. CTS frame1 620 and CTS frame2 630 may correspond to frames including the same information. CTS frame1 620 and CTS frame2 630 may be transmitted to the AP within a decoding range without any collision between the frames (or interframe collision).

According to another exemplary embodiment of the present invention, the CTS frame transmitting STA may be determined based on the size of the allocated subband (or resource). The method for determining the CTS frame transmitting STA based on the size of the allocated subband (or resource) will be described later on. Alternatively, the CTS frame transmitting STA may also be randomly determined by the AP or the STA.

After performing the medium protection procedure based on the above-described RTS frame and CTS frame, the AP may transmit downlink data to each of the multiple STA targets through each of the multiple channels (or each of the subbands included in the multiple channels).

The AP may transmit downlink data to each of the multiple STAs through the subbands allocated to the target STA that is indicated based on the RTS frame. The downlink data may be carried through a PPDU that is based on a PPDU format or DL MU PPDU format, which will be described later on.

Among the 4 subbands included in the primary channel, the AP may transmit downlink data corresponding to STA1 to STA1 through 2 subbands, and the AP may transmit downlink data corresponding to STA2 to STA2 through the remaining 2 subbands.

Among the 4 subbands included in the primary channel, the AP may transmit downlink data corresponding to STA3 to STA3 through 3 subbands, and the AP may transmit downlink data corresponding to STA4 to STA4 through the remaining 1 subband.

The AP may transmit each of the plurality of downlink PPDUs including at least one downlink frame (or downlink data corresponding to at least one target STA) through each of the plurality of channels. For example, the downlink data 640 being transmitted to STA1 and STA2 by the AP through the primary channel based on DL MU OFDMA may be transmitted based on downlink PPDU1, and the downlink data 650 being transmitted to STA3 and STA4 by the AP through the secondary channel based on DL MU OFDMA may be transmitted based on downlink PPDU2. Each of downlink PPDU1 and downlink PPDU2 may each correspond to a data unit that is generated based on an IFFT process. A PPDU header of downlink PPDU1 may include identification information of STA1 and STA2, which correspond to target STAs that are to receive downlink data 640 through the subband included in the transmitting channel of downlink PPDU1, and information on the subband that is allocated to STA1 and STA2, which correspond to target STAs.

Alternatively, the AP may also transmit a PPDU of the DL MU PPDU format including downlink data 640 and 650 corresponding to the STA1, STA2, STA3, and STA4 through the primary channel and the secondary based on DL MU OFDMA. According to the exemplary embodiment of the present invention, a PPDU of the DL MU PPDU format, which is generated based on a single IFFT process within multiple channels (e.g., the primary channel and the secondary channel), may transmit downlink data 640 and 650 to the target STAs through the plurality of channels. A PPDU header of the PPDU of the DL MU PPDU format, which is generated based on a single IFFT process within multiple channels, may include identification information of STA1, STA2, STA3, and STA4, which correspond to target STAs that are to receive downlink data within multiple channels, and information on the subbands that are allocated each of STA1, STA2, STA3, and STA4, among the subbands included in the multiple channels.

Hereinafter, in the exemplary embodiment of the present invention, a case when the AP transmits downlink frame1 including downlink data 640 being transmitted to STA1 and STA2 through the primary channel and downlink frame2 including downlink data 650 being transmitted to STA3 and STA4 through the secondary channel will be assumed.

Hereinafter, a transmission method of a block ACK frame corresponding to the downlink data of a plurality of target STAs will be disclosed. A case when a plurality of target STAs successfully performs decoding on the downlink data that are transmitted from the AP and transmits a block ACK frame to the AP.

Each of the plurality of target STAs may transmit a block ACK frame to the AP through the same frequency resource as the transmitting channel (receiving channel) of the RTS frame.

For example, STA1 and STA2, which have received RTS frame1 600 through the primary channel, may transmit a block ACK frame to the AP through the primary channel. And, STA3 and STA4, which have received RTS frame2 610 through the primary channel, may transmit a block ACK frame to the AP through the secondary channel.

In case the plurality of target STAs are required to transmit block ACK frames through the same frequency resource and the transmitting channel of the RTS frame, one of the target STAs, among the plurality of target STAs, may first receive downlink data from the AP, and may then immediately transmit a block ACK frame without any triggering from a separate frame (e.g., block acknowledgement request (BAR) frame). The remaining target STAs, among the plurality of target STAs, may transmit block ACK frames to the AP after receiving a BAR frame from the AP.

For example, STA1 and STA2, which correspond to the plurality of target STAs, may receive RTS frame1 600 through the primary channel. STA1, which corresponds to one of the STAs among STA1 and STA2, may first receive downlink data from the AP through a subband included in the primary channel and may then immediately transmit block ACK frame1 660 to the AP through the primary channel. STA2, which corresponds to the remaining STA, may first receive downlink data from the AP through the subband included in the primary channel and may then receive a BAR frame 665 from the AP and may transmit block ACK frame2 670 to the AP through the primary channel.

STA3 and STA4, which correspond to the plurality of target STAs, may receive RTS frame2 610 through the secondary channel STA3, which corresponds to one of the STAs among STA3 and STA4, may first receive downlink data from the AP through a subband included in the secondary channel and may then immediately transmit block ACK frame3 680 to the AP through the secondary channel. STA4, which corresponds to the remaining STA, may first receive downlink data from the AP through the subband included in the secondary channel and may then receive a BAR frame 685 from the AP and may transmit block ACK frame4 690 to the AP through the secondary channel.

The STA that immediately transmits a block ACK frame after receiving downlink data from the AP may be expressed by using the term immediate block ACK transmitting STA (immediate BACK sender). The immediate block ACK transmitting STA may be determined based on diverse methods.

The immediate block ACK transmitting STA may be determined based on the RA field included in a RTS frame. The immediate block ACK transmitting STA may correspond to the first (or foremost) STA, among the plurality of STAs, to be indicated based on the RA field included in a RTS frame.

A bit of the RA field of RTS frame1 600, which is transmitted through the primary channel, may sequentially indicate an identifier of STA1 and an identifier of STA2. In this case, among STA1 and STA2, STA1, which is first indicated based on the RA field, may correspond to the immediate block ACK transmitting STA. Each of STA1 and STA2 may decode the RA field of RTS frame1 600, and may then determine, based on the decoded result, whether to immediately transmit the block ACK after the reception of the downlink data or to immediately transmit the block ACK after the reception of the BAR frame. STA1, which corresponds to the immediate block ACK transmitting STA, may immediately transmit block ACK frame1 660 to the AP through the primary channel after receiving the downlink data included in downlink frame1 640. STA2, which does not correspond to the immediate block ACK transmitting STA, may receive a BAR frame 665 and may then immediately transmit block ACK frame2 670 to the AP through the primary channel.

The RA field of RTS frame2 610, which is transmitted through the secondary channel, may sequentially include an identifier of STA3 and an identifier of STA4. In this case, among STA3 and STA4, STA3, which is first indicated based on the RA field, may correspond to the immediate block ACK transmitting STA. Each of STA3 and STA4 may decode the RA field of RTS frame2 610, and may then determine, based on the decoded result, whether to immediately transmit block ACK3 after the reception of the downlink data included in downlink frame2 650 or to immediately transmit block ACK3 after the reception of the BAR frame 685. STA3, which corresponds to the immediate block ACK transmitting STA, may immediately transmit block ACK frame3 680 to the AP through the secondary channel after receiving the downlink data. STA4, which does not correspond to the immediate block ACK transmitting STA, may receive a BAR frame 685 and may then immediately transmit block ACK frame4 690 to the AP through the secondary channel.

According to another exemplary embodiment of the present invention, the immediate block ACK transmitting STA may be determined based on the size of an allocated subband. Referring to the secondary channel of FIG. 6, among the 4 subbands included in the secondary channel, since 3 subbands are allocated to STA3, STA3 may be determined as the immediate block ACK transmitting STA. Alternatively, the immediate block ACK transmitting STA may also be randomly determined by the AP or the STA.

According to another exemplary embodiment of the present invention, subband allocation for the target STA in order to limit (or restrict) the transmission procedures of the BAR frame and the block ACK frame based on the BAR frame only from the secondary channel may be performed.

In order to limit (or restrict) the transmission procedures of the BAR frame and the block ACK frame based on the BAR frame only from the secondary channel, as described above, the AP may determine the number of target STAs receiving downlink data through the primary channel to be larger than the number of target STAs receiving downlink data through the secondary channel. In this case, the transmission procedure of the block ACK frame through the primary channel may be performed longer than the transmission procedure of the block ACK frame through the secondary channel. A clear channel assessment (CCA) level (or CCA threshold value) that is used for determining only whether the secondary channel is idle or busy may be higher than a CCA level that is used for determining whether the primary channel is idle or busy. In this case, non-target STAs excluding the target STAs may determine relatively more easily that the secondary channel is idle, and the likelihood of collision between the frames being transmitted through the secondary channel may be relatively higher. Therefore, in order to reduce the collision between the frame, the transmission or reception procedure of the block ACK frame through the secondary channel may be configured to end (or be completed) earlier than the transmission or reception procedure of the block ACK frame through the primary channel Based on the above-described method, the overall wireless LAN transmission efficiency may be enhanced.

Figure 7:
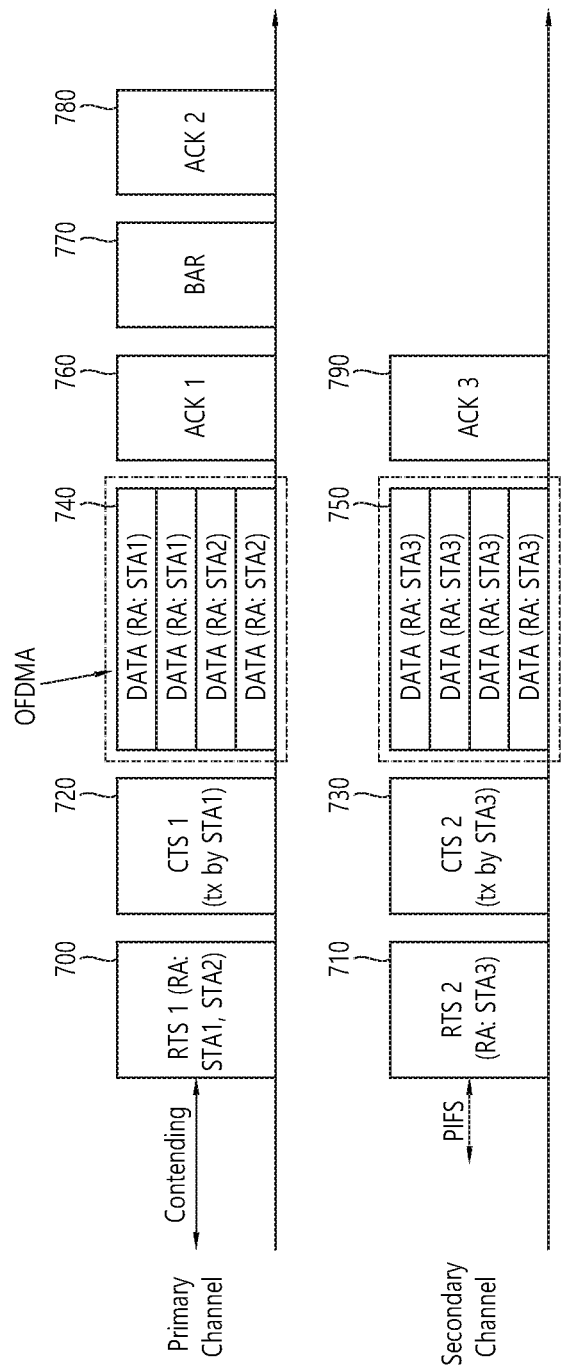
FIG. 7 is a conceptual view illustrating a DL MU OFDMA transmission method based on medium protection according to an exemplary embodiment of the present invention.

FIG. 7 is a conceptual view illustrating a DL MU OFDMA transmission method based on medium protection according to an exemplary embodiment of the present invention.

FIG. 7 discloses a transmission of the downlink data performed by the AP based on DL MU OFDMA through each of the primary channel and the secondary channel after performing a medium protection procedure based on a RTS frame and a CTS frame. Most particularly, FIG. 7 discloses a method of having the AP allocate a larger number of STAs through the primary channel.

Referring to FIG. 7, the AP may transmit multiple RTS frame through each of the multiple channels within an overlapping time resource. The AP may transmit RTS frame1 700 and RTS frame2 710 through each of the primary channel and the secondary channel.

As described above, according to the exemplary embodiment of the present invention, each of the plurality of RTS frames being transmitted through each of the plurality of channels may include identification information of at least one target STA that is to receive downlink data through a plurality of subbands being included in the transmitting channel of the RTS frame, among the plurality of channels, and information on the target STA allocation subband being allocated to at least one target STA for the transmission of the downlink data.

For example, the RA field of RTS frame1 700, which is transmitted through the primary channel, may include information on the identifiers of each of STA1 and STA2, which correspond to target STAs that are to receive downlink data through the primary channel. Additionally, the RA field (or resource allocation field) of RTS frame1 700 may include information on the subbands being allocated to each of STA1 and STA2 as information on the target STA allocation resource. For example, the RA field (or resource allocation field) of RTS frame1 700 may indicate that, among the 4 subbands included in the primary channel, 2 subbands are allocated to STA1 for the transmission of downlink data, and that the remaining 2 subbands are allocated to STA2 for the transmission of downlink data.

The RA field of RTS frame2 710, which is transmitted through the secondary channel, may include information on the identifiers of each of STA3 and STA4, which correspond to target STAs that are to receive downlink data through the secondary channel Additionally, the RA field (or resource allocation field) of RTS frame2 710 may include information on the subbands being allocated to each of STA3 and STA4 as information on the target STA allocation resource. For example, the RA field (or resource allocation field) of RTS frame2 710 may indicate that, among the 4 subbands included in the secondary channel, 4 subbands are allocated to STA3 for the transmission of downlink data.

In case the AP performs DL MU OFDMA transmission to the target STA within the primary channel and the secondary channel, the AP may allocated a relatively larger number of target STAs to the primary channel. As shown in FIG. 7, in case 3 target STAs receive downlink data based on the DL MU OFDMA transmission, the target STA allocation subbands of 2 target STAs may be allocated to the primary channel, and the target STA allocation subband of the remaining one target STA may be allocated to the secondary channel. As described above, the transmission or reception procedure of the block ACK frame through the secondary channel may be configured to be completed earlier than the transmission or reception procedure of the block ACK frame through the primary channel. Accordingly, as described above, since the collision of the frames is reduced, efficiency in the wireless LAN may be enhanced.

After receiving the downlink data, the plurality of target STAs may transmit a block ACK frame to the AP through the same frequency resource as the transmitting channel of the RTS frame. For example, STA1 and STA2, which have received RTS frame1 700 through the primary channel, may transmit block ACK frame1 760 to the AP through the primary channel. STA1 may correspond to the immediate block ACK transmitting STA. STA2 may receive a BAR frame 770 from the AP and may then transmit block ACK frame2 780 to the AP. STA3 may first receive downlink data from the AP through the subband being included in the secondary channel, and, then, STA3 may immediately transmit block ACK frame3 790 to the AP through the secondary channel.

Figure 8:
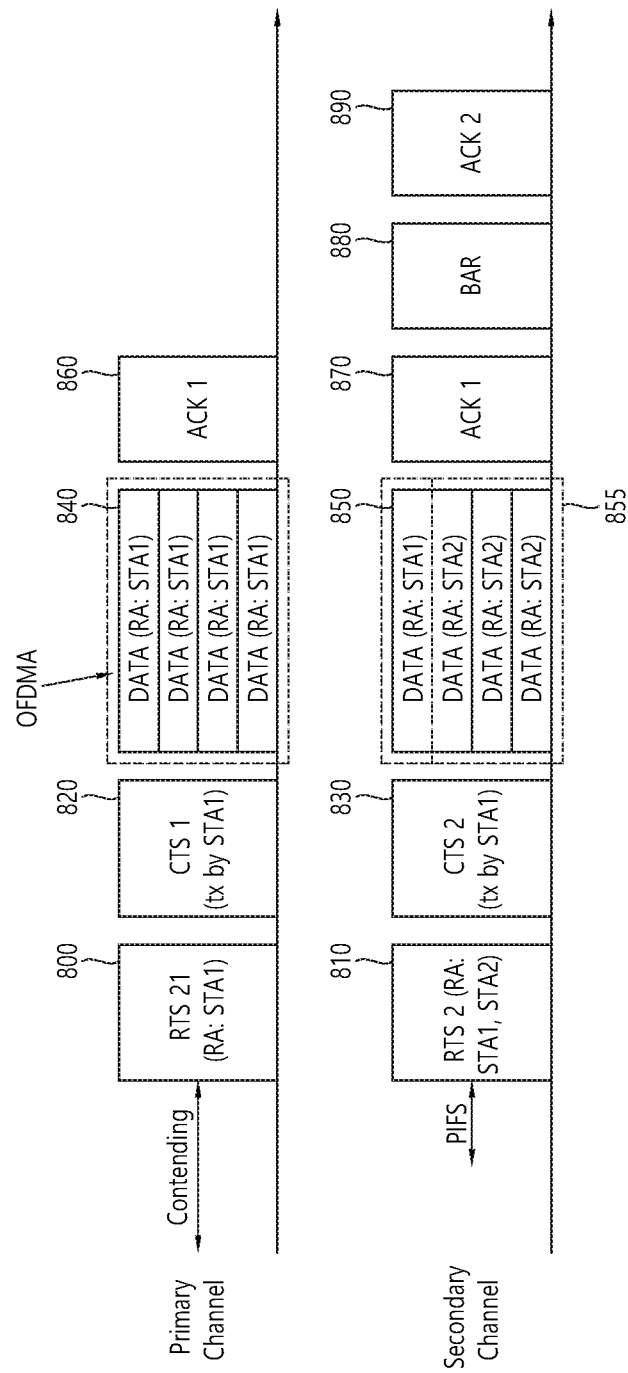
FIG. 8 is a conceptual view illustrating a DL MU OFDMA transmission method based on medium protection according to an exemplary embodiment of the present invention.

As shown in FIG. 8, which will be described in detail later on, in case the AP transmits downlink data to a specific STA through a larger number of subbands as compared to the number of subbands being included in the primary channel, the number of target STAs receiving downlink data through the secondary channel may be larger than the number of target STAs receiving downlink data through the primary channel.

FIG. 8 is a conceptual view illustrating a DL MU OFDMA transmission method based on medium protection according to an exemplary embodiment of the present invention.

FIG. 8 discloses a transmission of the downlink data performed by the AP based on DL MU OFDMA through each of the primary channel and the secondary channel after performing a medium protection procedure based on a RTS frame and a CTS frame. Most particularly, FIG. 8 discloses a case when the subbands being included in each of the plurality of channels are being allocated as the target STA allocation resource for STA1.

Referring to FIG. 8, the AP may transmit downlink data to STA1 through the primary channel and may transmit downlink data to STA1 and STA2 through the secondary channel.

First of all, the AP may transmit each of the plurality of RTS frame through each of the plurality of channel within an overlapping time resource. The AP may respectively transmit RTS frame1 and RTS frame2 through each of the primary channel and the secondary channel.

For example, the RA field of RTS frame1 800, which is transmitted through the primary channel, may include information on the identifier of STA1, which corresponds to the target STA that is to receive downlink data through the primary channel. Additionally, the RA field (or resource allocation field) of RTS frame1 800 may include information on the subband (or resource) being allocated to STA1 as the information on the target STA allocation resource. For example, the RA field (or resource allocation field) of RTS frame1 800 may indicate that, among the 4 subbands included in the primary channel, 4 subbands are allocated to STA1 for the transmission of downlink data.

The RA field of RTS frame2 810, which is transmitted through the secondary channel, may include information on the identifiers of each of STA1 and STA2, which correspond to target STAs that are to receive downlink data through the primary channel Additionally, the RA field (or resource allocation field) of RTS frame2 810 may include information on the subbands (or resources) being allocated to each of STA1 and STA2 as information on the target STA allocation resource. For example, the RA field (or resource allocation field) of RTS frame2 810 may indicate that, among the 4 subbands included in the secondary channel, 1 subband is allocated to STA1 for the transmission of downlink data, and that the remaining 3 subbands are allocated to STA2 for the transmission of downlink data.

In case STA1 is indicated firsthand within the RA field of RTS frame1 800, STA1 may transmit a CTS frame through the primary channel and the secondary channel.

STA1 may transmit CTS PPDU1 820 including the CTS frame through the primary channel and may transmit CTS PPDU2 830 including the CTS frame through the secondary channel. CTS PPDU1 and CTS PPDU2 may be generated based on a separate IFFT. Alternatively, STA1 may transmit one CTS PPDU including a CTS frame through the primary channel and the secondary channel.

The AP may receive a CTS frame through the primary channel and the secondary channel and may transmit downlink data to STA1 and STA2 through the primary channel and the secondary channel.

STA1 may receive downlink data 840 and 850 being transmitted by the AP through the subbands included in each of the primary channel and the secondary channel and being allocated to STA1, and STA2 may receive downlink data 855 being transmitted by the AP through the subbands included in the secondary channel and being allocated to STA2.

STA1, which corresponds to an immediate block ACK transmitting STA, may transmit block ACK PPDU1 including block ACK frame1 860 through the primary channel as a response to the downlink data 840, which are received through the primary channel, and may transmit block ACK PPDU1 including block ACK frame1' 870 through the secondary channel as a response to the downlink data 850, which are received through the secondary channel. Block ACK frame1 860 may include ACK information on the downlink data that are received through the primary channel And, block ACK frame1' 870 may include ACK information on the downlink data that are received through the secondary channel. Block ACK PPDU1 and block ACK PPDU1' may be generated based on a separate IFFT.

STA1 may also transmit one block ACK PPDU including a block ACK frame through the primary channel and the secondary channel. The one block ACK PPDU being transmitted through the primary channel and the secondary channel may be generated based on a single IFFT and may then be transmitted. The block ACK frame being included in the one block ACK PPDU may include ACK information on the downlink data being received through the primary channel and the downlink data being received through the secondary channel.

STA2, which does not correspond to the immediate block ACK transmitting STA, may receive a BAR frame 880 from the AP and may transmit block ACK frame2 890 to the AP as a response to the received BAR frame 880.

According to another exemplary embodiment of the present invention, the STA may receive downlink data through a plurality of channel and may then transmit a block ACK frame corresponding to the downlink data received through the plurality of channel to the AP through one of the channels.

Figure 9:
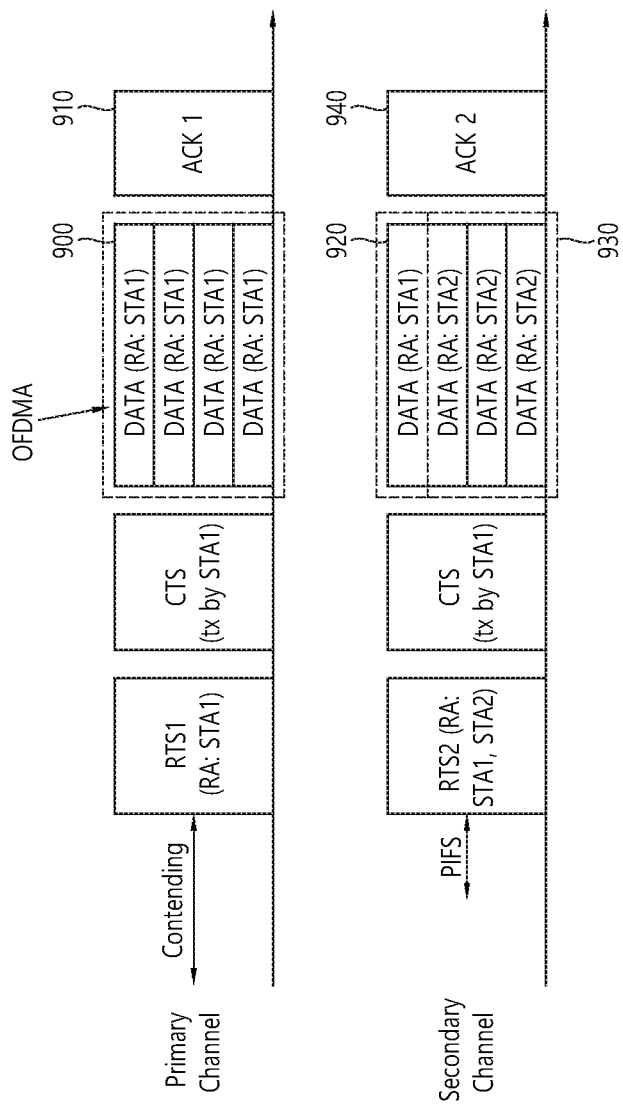
FIG. 9 is a conceptual view illustrating a DL MU OFDMA transmission method based on medium protection according to an exemplary embodiment of the present invention.

FIG. 9 is a conceptual view illustrating a DL MU OFDMA transmission method based on medium protection according to an exemplary embodiment of the present invention.

FIG. 9 discloses a method of having the STA receive downlink data through a plurality of channels and transmit a block ACK frame corresponding to the downlink data, which are received through the plurality of channels, to the AP through one of the channels.

Referring to FIG. 9, as shown in FIG. 8, STA1 may receive downlink data through subbands included in the primary channel and the secondary channel STA2 may receive downlink data through a subband included in the secondary channel.

STA1 may transmit block ACK frame1 910 (or a block ACK PPDU including block ACK frame1) corresponding to the downlink data. Block ACK frame1 910, which is transmitted by STA1 through the primary channel, may include ACK information on the downlink data 900 being transmitted to STA1 through the primary channel and the downlink data 920 being transmitted to STA2 through the secondary channel.

More specifically, the block ACK frame being transmitted by STA1 through a specific channel may include ACK information on the downlink data being transmitted not only through the specific channel but also through another channel. Most particularly, block ACK frame1, which is transmitted by STA1 through the primary channel, may include ACK information on the downlink data being received through the primary channel and the downlink data being received through the secondary channel.

STA2 may transmit block ACK frame2 940, which includes ACK information on the downlink data 930 received through the secondary channel, to the AP through the secondary channel.

Figure 10:
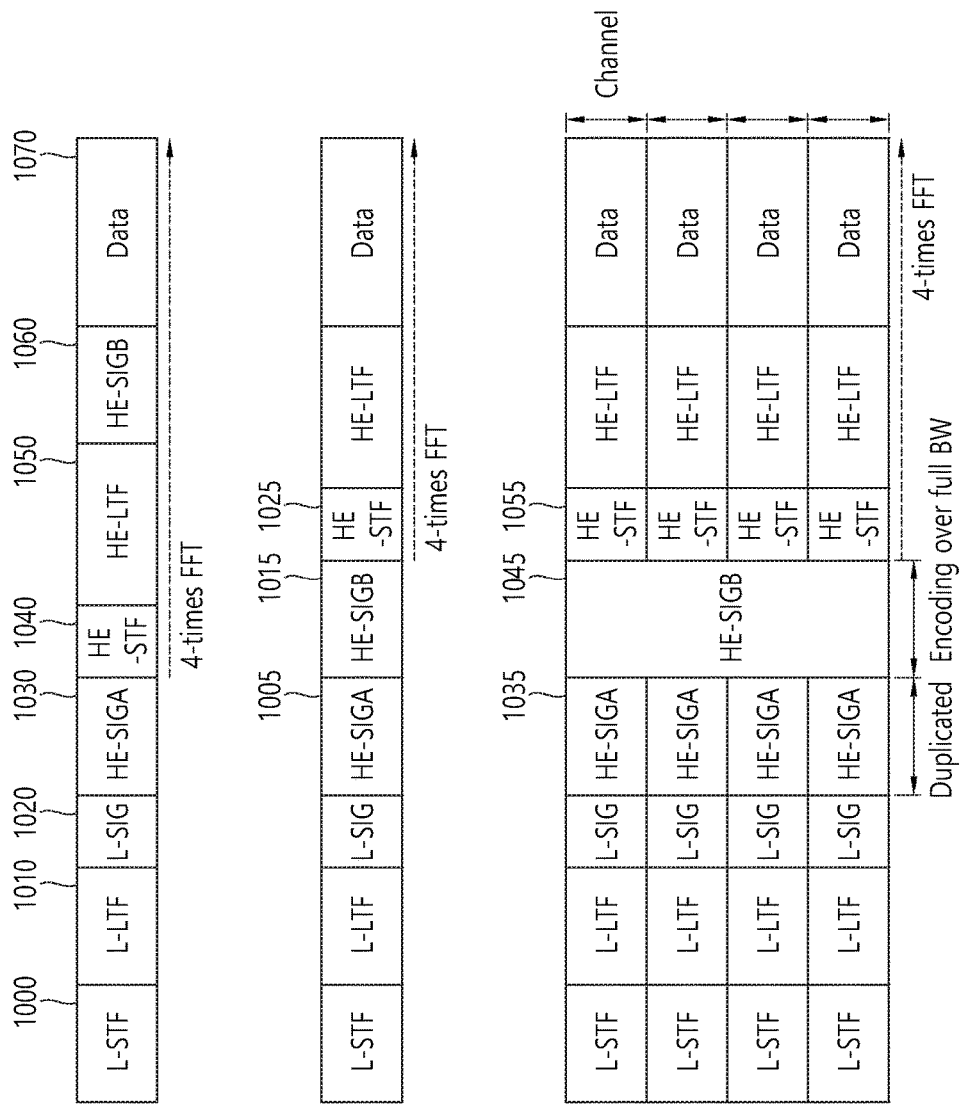
FIG. 10 is a conceptual view illustrating a PPDU format for the transmission of a frame according to an exemplary embodiment of the present invention.

FIG. 10 is a conceptual view illustrating a PPDU format for the transmission of a frame according to an exemplary embodiment of the present invention.

FIG. 10 discloses a PPDU format according to an exemplary embodiment of the present invention. Based on the PPDU format shown in FIG. 15, the above-described frames (e.g., RTS frame, downlink frame, block ACK frame, and so on) may be carried.

Referring to the upper part of FIG. 10, a PPDU header of a downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal B (HE-SIG B). The PPDU may be divided into a legacy part, which consists of a part starting from the PHY header to the L-SIG, and a high efficiency (HE) part, which consists of a part after the L-SIG.

The L-STF 1000 may include a short training orthogonal frequency division multiplexing (OFDM) symbol. The L-STF 1000 may be used for frame detection, automatic gain control (AGC), diversity detection, and coarse frequency/time synchronization.

The L-LTF 1010 may include a long training orthogonal frequency division multiplexing (OFDM) symbol. The L-LTF 1010 may be used for fine frequency/time synchronization and channel prediction.

The L-SIG 1020 may be used for transmitting control information. The L-SIG 1020 may include information on data transmission rate, data length, and so on.

The HE-SIG A 1030 may also include information for indicating a STA (or AP) that is to receive the PPDU. For example, HE-SIG A 1030 may include an identifier of a specific STA that is to receive the PPDU and information for indicating a group of specific STAs. Additionally, in case the PPDU is transmitted based on OFDMA or MIMO, the HE-SIG A 1030 may also include allocation information corresponding to the downlink resource for the reception of the downlink data of the STA.

Additionally, the HE-SIG A 1030 may also include color bits information for BSS identification information, bandwidth information, tail bit, CRC bit, modulation and coding scheme (MCS) information on the HE-SIG B 1060, information on the number of symbols for the HE-SIG B 1060, and cyclic prefix (CP) (or guard interval (GI)) length information.

Also, the HE-SIG A 1030 may include information on the target STA that is to receive downlink data (or RTS frame, ACK frame) and information on the target STA allocated resource (or subband). The target STA may receive downlink data (or RTS frame, ACK frame) from the AP through the indicated target STA allocated resource (subband).

The HE-STF 1040 may be used for enhancing automatic gain control estimation in a multiple input multiple output (MIMO) environment or an OFDMA environment.

The HE-LTF 1050 may be used for estimating a channel in a MIMO environment or an OFDMA environment.

The HE-SIG B 1060 may include information on a length MCS of a physical layer service data unit (PSDU) for each STA and a tail bit, and so on. Additionally, the HE-SIG B

1060 may also include information on the STA that is to receive the PPDU and information on the resource allocation based on OFDMA (or MU-MIMO information). In case the resource allocation information based on OFDMA (or MU-MIMO related information) is included in the HE-SIG B 1060, the corresponding information may not be included in the HE-SIG A 1030.

The IFFT size being applied to the HE-STF 1040 and the field after the HE-STF 1040 may be different from the IFFT size being applied to the field before the HE-STF 1040. For example, the IFFT size being applied to the HE-STF 1040 and the field after the HE-STF 1040 may be four times larger than the IFFT size being applied to the field before the HE-STF 1040. The STA may receive the HE-SIG A 1030 and may receive an indication to receive a downlink PPDU based on the HE-SIG A 1030. In this case, the STA performs decoding based on the FFT size, which is changed starting from the HE-STF 1040 and the field after the HE-STF 1040. Conversely, in case the STA does not receive indication to receive the downlink PPDU based on the HE-SIG A 1030, the STA may stop the decoding process and may perform network allocation vector (NAV) configuration. A cyclic prefix (CP) of the HE-STF 1040 may have a size that is larger than the CP of other fields, and, during such CP period, the STA may change the FFT size and may perform decoding on the downlink PPDU.

The order of the fields configuring the format of the PPDU shown in the upper part of FIG. 10 may also be changed. For example, as shown in the middle part of FIG. 10, the HE-SIG B 1015 may be positioned immediately after the HE-SIG A 1005. The STA may perform decoding up to the HE-SIG A 1005 and the HE-SIG B 1015 and may receive the required control information and may then perform NAV configuration. Similarly, the IFFT size being applied to the HE-STF 1025 and the field after the HE-STF 1025 may be different from the IFFT size being applied to the field before the HE-STF 1025.

The STA may receive the HE-SIG A 1005 and the HE-SIG B 1015. In case the reception of the PPDU is indicated by the HE-SIG A 1005, the STA may change the FFT size starting from the HE-STF 1025 and may then perform decoding on the PPDU. Conversely, the STA may receive the HE-SIG A 1005, and, in case the reception of the downlink PPDU is not indicated based on the HE-SIG A 1005, the network allocation vector (NAV) configuration may be performed.

Referring to the lower part of FIG. 10, a PPDU format (DL MU PPDU format) for DL MU transmission is disclosed. The DL MU PPDU may be used for transmitting downlink data to multiple STAs through different transmission resources (frequency resources (channels, subbands)).

As described above, the AP may transmit downlink frame1 for a plurality of target STAs through the primary channel and may transmit downlink frame2 for a plurality of target STAs through the secondary channel within an overlapping time resource. Each of downlink PPDU1 carrying (or delivering) downlink frame1 and downlink PPDU2 carrying (or delivering) downlink frame2 may have a PPDU format for DL MU transmission, which is disclosed in the lower part of FIG. 10. The HE-SIG A 1035 of downlink PPDU1 may include information on an identifier of a target STA receiving downlink data through the primary channel and information on a target STA allocation subband. The HE-SIG A 1035 of downlink PPDU2 may include information on an identifier of a target STA receiving downlink data through the secondary channel and information on a target STA allocation subband.

Similarly, one DL MU PPDU that is generated based on a single IFFT process within a plurality of channels (e.g., the primary channel and the secondary channel) may transmit downlink data to a target STA through a plurality of channels. The HE-SIG A 1035 of a PPDU header of a PPDU corresponding to the DL MU PPDU format that is generated based on a single IFFT process within a plurality of channels may include information on a target STA that is to receive the downlink data within a plurality of channels and information on a subband that is allocated to the target STA, among the subbands being included in the plurality of channels.

In addition to the transmission of the downlink frame, such DL MU PPDU format may also be used for the transmission of a RTS frame and the transmission of a block ACK frame to a plurality of STAs.

Within the PPDU, the fields before the HE-SIG B 1045 may each be transmitted from different transmission resources in duplicated forms. The HE-SIG B 1045 may be transmitted in an encoded form over the entire transmission resources. Alternatively, the HE-SIG B 1045 may be encoded in the same unit (e.g., 20 MHz) as the legacy part and may be duplicated in 20 MHz units within the entire transmission resource and may then be transmitted. Although the HE-SIG B 1045 may be encoded in the same unit (e.g., 20 MHz) as the legacy part, the HE-SIG B 1045 that is being transmitted through each of the multiple 20 MHz units, which are included in the entire transmission resource, may also include different sets of information.

The fields after the HE-SIG B 1045 may include individual information for each of the multiple STAs receiving the PPDU.

In case each of the fields included in the PPDU is transmitted through each transmission resource, the CRC for each field may be included in the PPDU. Conversely, in case a specific field included in the PPDU is encoded and transmitted over the entire transmission resource, the CRC for each field may not be included in the PPDU. Therefore, the overhead for the CRC may be reduced.

Similarly, in the PPDU format for the DL MU transmission, the HE-STF 1055 and the field after the HE-STF 1055 may also be encoded based on an IFFT size that is different from the field before the HE-STF 1055. Therefore, in case the STA receives the HE-SIG A 1035 and the HE-SIG B 1045 and receives an indication on the reception of the PPDU based on the HE-SIG A 1035, the STA may change the FFT size starting from the HE-STF 1055 and may then perform decoding on the PPDU.

Figure 11:
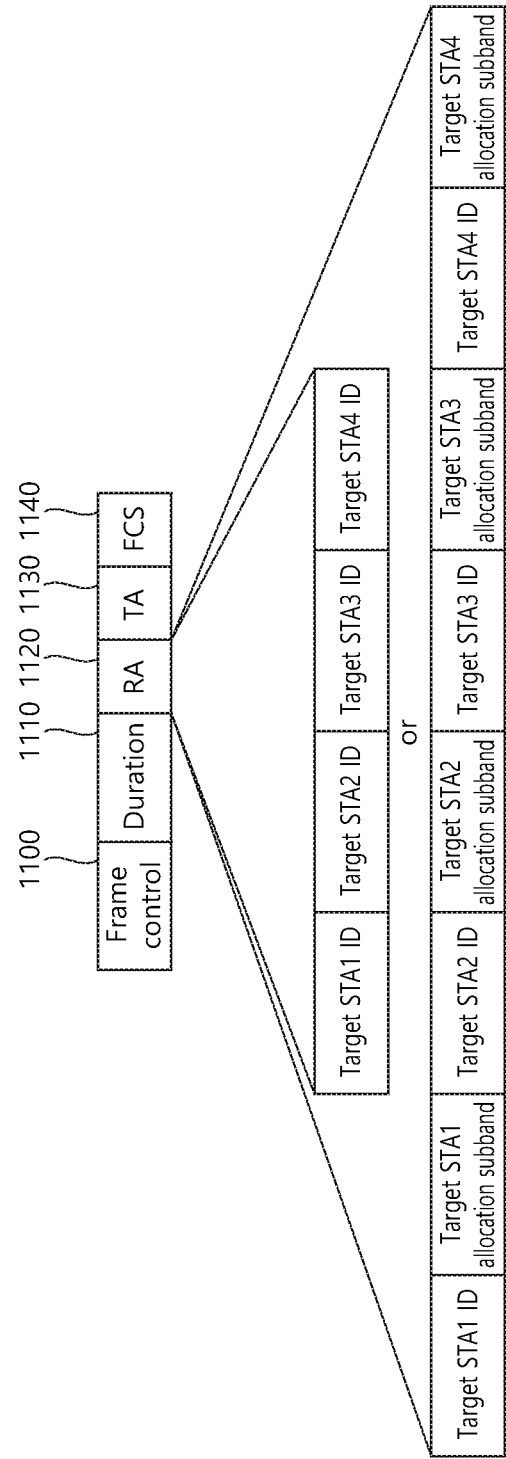
FIG. 11 is a conceptual view illustrating a RTS frame format according to an exemplary embodiment of the present invention.

FIG. 11 is a conceptual view illustrating a RTS frame format according to an exemplary embodiment of the present invention.

Referring to FIG. 11, a RTS frame may include a frame control field 1100, a duration field 1110, a receiver address (RA) field 1120, a transmitter address (TA) field 1130, and a frame check sequence (FCS) frame 1140.

The frame control field 1100 may include information for indicating a RTS frame.

The duration field 1110 may include duration information for the transmission of a CTS frame, a downlink frame being transmitted to each of the plurality of STAs, and an ACK frame.

The RA field 1120 may include identification information of a target STA.

For example, the RA field 1120 may correspond to a field of 48 bits (6 octets). In case downlink data are transmitted to a maximum of 4 target STAs, 12 bits may be allocated per target STA. Each of the 12 bits being included in the 48 bits may include identification information of the corresponding target STA.

Alternatively, the RA field 1120 may include identification information of the target STA and information on a target STA allocation subband (or resource). For example, the 12 bits may include a target STA allocation subband (0~2 bits) and a partial ID (9~10 bits) of the STA.

The TA field 1130 may include an address of an AP transmitting the RTS frame.

The FCS field 1140 may include information for verifying the validity of a frame.

Figure 12:
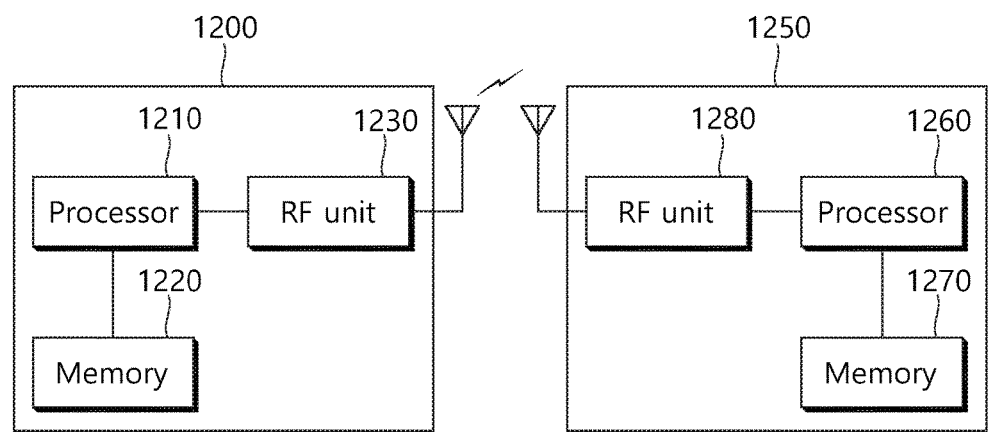
FIG. 12 is a block view illustrating a wireless device to which the exemplary embodiment of the present invention can be applied.

FIG. 12 is a block view illustrating a wireless device to which the exemplary embodiment of the present invention can be applied.

Referring to FIG. 12, as an STA that can implement the above-described exemplary embodiment, the wireless device 1200 may correspond to an AP 1200 or a non-AP station (STA) 1250.

The AP 1200 includes a processor 1210, a memory 1220, and a radio frequency (RF) unit 1230.

The RF unit 1230 is connected to the processor 1210, thereby being capable of transmitting and/or receiving radio signals.

The processor 1210 implements the functions, processes, and/or methods proposed in the present invention. For example, the processor 1210 may be implemented to perform the operations of the AP according to the above-described exemplary embodiments of the present invention. The processor may perform the operations of the AP, which are disclosed in the exemplary embodiments of FIG. 1 to FIG. 11.

For example, the processor 1210 may be configured to transmit a first Request to Send (RTS) frame to a plurality of first target STAs through a first channel (e.g., primary channel) and to receive a first Clear to Send (CTS) frame from one first target STA, among the plurality of first target STAs, through the first channel as a response to the first RTS frame. The one first target STA may be determined based on an order of identification information respective to each of the plurality of first target STAs. Additionally, the processor 1210 may be configured to transmit each of the plurality of first downlink data respective to each of the plurality of first target STAs to each of the plurality of first target STAs through each of a plurality of first subbands being included in the first channel through within a single data frame. The first RTS frame may include identification information on each of the plurality of first target STAs. Additionally, the first RTS frame may further include information on each of the plurality of first subbands being respectively allocated to each of the plurality of first target STAs.

Moreover, the processor 1210 may be configured to receive a first block ACK frame from one first target STA after the transmission of one first data frame, and to receive a second block ACK frame from each of the remaining first target STAs, excluding the one first target STA among the plurality of first target STAs, as a response to a block acknowledgement request (BAR) frame. A first block ACK frame may include ACK information on the first downlink data corresponding to the one first target STA among the plurality of first downlink data, and a second block ACK frame may include ACK information on the first downlink data corresponding to the remaining first target STAs among the plurality of first downlink data.

Also, the processor 1210 may be configured to transmit a second RTS frame to a plurality of second target STAs through a second channel within a time resource overlapping with the transmission time resource of the first RTS frame, and to receive a second CTS frame from one second target STA, among a plurality of second target STAs, through the second channel within a time resource overlapping with the reception time resource of the first CTS frame as a response to the second RTS frame. Furthermore, the processor 1210 may be configured to transmit each of the plurality of second downlink data respective to each of the plurality of second target STAs to each of the plurality of second target STAs within one second data frame through each of the plurality of second subbands being included in the second channel within a time resource overlapping with the reception time resource of each of the plurality of first downlink data. The second RTS frame may include identification information corresponding to each of the plurality of second target STAs.

The STA 1250 includes a processor 1260, a memory 1270, and a radio frequency (RF) unit 1280.

The RF unit 1280 is connected to the processor 1260, thereby being capable of transmitting and/or receiving radio signals.

The processor 1260 implements the functions, processes, and/or methods proposed in the present invention. For example, the processor 1260 may be implemented to perform the operations of the STA according to the above-described exemplary embodiments of the present invention. The processor may perform the operations of the STA, which are disclosed in the exemplary embodiments of FIG. 1 to FIG. 11.

For example, the processor 1260 may receive a RTS frame from the AP and may then determine whether or not to transmit a CTS frame to the AP based on the identification information corresponding to the target STA and/or information corresponding to each of the plurality of subbands allocated to each of the target STAs, the information being included in the RTS frame. Additionally, the processor 1260 may be configured to receive downlink data through a subband, which is indicated based on a PPDU header of a downlink PPDU carrying (or delivering) a RTS frame or downlink data frame. Furthermore, based on identification information corresponding to the target STA and/or information corresponding to each of a plurality of first subbands allocated to each first target STA, the information being included in the RTS frame, the processor 1260 may determine whether to transmit a block ACK frame after a predetermined period of time (e.g., short interframe space (SIFS)) after receiving downlink data or to transmit a block ACK frame after receiving a BAR frame.

The processor 1210 and 1260 may include an application-specific integrated circuit (ASIC), another chip set, a logical circuit, a data processing device, and/or a converter converting a baseband signal and a radio signal to and from one another. The memory 1220 and 1270 may include a read-only memory (ROM), a random access memory (RAM), a flash memory, a memory card, a storage medium, and/or another storage device. The RF unit 1230 and 1280 may include one or more antennas transmitting and/or receiving radio signals.

When the exemplary embodiment is implemented as software, the above-described method may be implemented as a module (process, function, and so on) performing the above-described functions. The module may be stored in the memory 1220 and 1270 and may be executed by the processor 1210 and 1260. The memory 1220 and 1270 may be located inside or outside of the processor 1210 and 1260 and may be connected to the processor 1210 and 1260 through a diversity of well-known means.

What is claimed is:

1. A method for transmitting a frame in a wireless local area network (WLAN), the method comprising:

transmitting, by an access point (AP), a first Request-to-Send (RTS) frame to a plurality of first target stations (STAs) via a first channel, and a second RTS frame to a plurality of second target STAs via a second channel within a same time resource as the first RTS frame, wherein the first RTS frame includes first information for identifying the plurality of first target STAs and second information related to a plurality of first subbands allocated for the plurality of first target STAs, wherein the second RTS frame includes third information for identifying the plurality of second target STAs and fourth information related to a plurality of second subbands allocated for the plurality of second target STAs, wherein the plurality of first subbands are included in the first channel, and wherein the plurality of second subbands are included in the second channel;

after transmission of the first RTS frame and the second RTS frame, receiving, by the AP, a first Clear-to-Send (CTS) frame from only one of the plurality of first target STAs via the first channel, and a second CTS frame from only one of the plurality of second target STAs via the second channel, wherein the second CTS frame is received within a same time resource as the first CTS frame; and transmitting, by the AP, a plurality of first downlink (DL) data frames to the plurality of first target STAs via the plurality of first subbands based on the second information after receiving the first CTS frame, and a plurality of second DL data frames to the plurality of second target STAs via the plurality of second subbands based on the fourth information within a same time resource as the plurality of first DL data frames after receiving the second CTS frame.

2. The method of claim 1, wherein the one of the plurality of first target STAs is determined based on an order of the plurality of first target STAs based on the first information.

3. The method of claim 2, further comprising:

receiving, by the AP, a first block acknowledgement (ACK) frame from the one of the plurality of first target STAs based on transmitting the plurality of first DL data frames; and receiving, by the AP, a second block ACK frame from at least another of the plurality of first target STAs in response to a block acknowledgement request (BAR) frame, wherein the at least another of the plurality of first target STAs is different from the one of the plurality of first target STAs, wherein the first block ACK frame includes acknowledgement (ACK) information related to the one of the plurality of first target STAs, and wherein the second block ACK frame includes second ACK information related to the at least another of the plurality of first target STAs.

4. An access point (AP) for transmitting a frame in a wireless local area network (WLAN), the AP comprising:

a radio frequency (RF) unit configured to transmit and receive radio signals; and a processor operatively connected to the RF unit and configured to:

control the RF unit to transmit a first Request-to-Send (RTS) frame to a plurality of first target stations (STAs) via a first channel, and a second RTS frame to a plurality of second target STAs via a second channel within a same time resource as the first RTS frame, wherein the first RTS frame includes first information for identifying the plurality of first target STAs and second information related to a plurality of first subbands allocated for the plurality of first target STAs, wherein the second RTS frame includes third information for identifying the plurality of second target STAs and fourth information related to a plurality of second subbands allocated for the plurality of second target STAs, wherein the plurality of first subbands are included in the first channel, and wherein the plurality of second subbands are included in the second channel;

after transmission of the first RTS frame and the second RTS frame, control the RF unit to receive a first Clear-to-Send (CTS) frame from only one of the plurality of first target STAs via the first channel, and a second CTS frame from only one of the plurality of second target STAs via the second channel, wherein the second CTS frame is received within a same time resource as the first CTS frame; and control the RF unit to transmit a plurality of first downlink (DL) data frames to the plurality of first target STAs via the plurality of first subbands based on the second information after receiving the first CTS frame, and a plurality of second DL data frames to the plurality of second target STAs via the plurality of second subbands based on the fourth information within a same time resource as the plurality of first DL data frames after receiving the second CTS frame.

5. The AP of claim 4, wherein the one of the plurality of first target STAs is determined based on an order of the plurality of first target STAs based on the first information.

6. The AP of claim 5, wherein the processor is further configured to:

control the RF unit to receive a first block acknowledgement (ACK) frame from the one of the plurality of first target STAs based on the plurality of first DL data frames being transmitted; and control the RF unit to receive a second block ACK frame from at least another of the plurality of first target STAs in response to a block acknowledgement request (BAR) frame, wherein the at least another of the plurality of first target STAs is different from the one of the plurality of first target STAs, wherein the first block ACK frame includes acknowledgement (ACK) information related to the one of the plurality of first target STAs, and wherein the second block ACK frame includes ACK information related to the at least another of the plurality of first target STAs.

* * * * *